Patented Sept. 3, 1940

2,213,444

UNITED STATES PATENT OFFICE 2,213,444

CYCLIC PROCESS FOR THE PRODUCTION OF NITROPARAFFINS

Kenneth Johnson, Terre Haute, Ind., assignor to Commercial Solvents Corporation, Terre Haute, Ind., a corporation of Maryland No Drawing. Application February 3, 1938, Serial No. 188,464

8 Claims. (Cl. 260—644)

My invention relates to a process for the production of nitroparaffins by the vapor phase nitration of paraffin hydrocarbons, and more particularly to an improved process of this nature in which unreacted materials are recycled.

The nitration of paraffin hydrocarbons such as ethane, propane, butane and the like, is most advantageously carried out in a continuous vapor phase process, as described in U. S. Patents 1,967,667 and 2,071,122 of H. B. Hass, et al. In accordance with this process gaseous hydrocarbons and nitric acid vapors or nitrogen dioxide are reacted in a heated reaction chamber to produce nitroparaffins. The gaseous reaction products contain, in addition to the nitroparaffins produced, water vapor, unreacted nitric acid or nitrogen dioxide, unreacted paraffin hydrocarbons and small amounts of certain other compounds. In the patents referred to above it was recommended that for cyclic operation the unreacted nitric acid and oxides of nitrogen could be removed and the remaining gases could then be recycled after purging the uncondensable gases from the system. It was found that relatively low yields and conversions were obtained in recycling hydrocarbons in this manner, and an improved procedure is described in co-pending application, Serial No. 187,407 of Jerome Martin and Edward B. Hodge, filed January 28, 1938. According to this procedure the exit gases from the process, after separation of the nitroparaffins, are subjected to water scrubbing, preferably followed by sulfuric acid scrubbing, to remove aldehydes and ketones. This process has been found to be advantageous from the standpoint of improving the yields and conversions with recycled gases, but is not readily adapted for the recovery of the aldehydes and ketones thus removed from the nitration products. Likewise, in the case of sulfuric acid scrubbing, not only are the aldehydes and ketones destroyed, but the sulfuric acid, as well, is not recoverable from the scrubbing liquid.

I have now found that the aldehydes and ketones may be satisfactorily removed from the reaction products by scrubbing with a solution of an hydroxyl amine salt of the type herein specified. In accordance with this process the aldehydes and ketones may be completely removed from the gases, and may subsequently be recovered from the scrubbing liquid, with regeneration of the hydroxyl amine salt for further use in the process.

In carrying out my process, the nitration reaction may be effected in the known manner, as for example in accordance with the procedure described in the patents of Hass, et al., referred to above. The reaction may be effected at atmospheric pressure, or at increased pressures, and the entire system for the recycling of the gases may be maintained at the reaction pressure. The products leaving the reaction vessel may suitably be cooled in the usual manner to remove nitroparaffins and water vapor, and the resulting gases may then be subjected to scrubbing with the hydroxyl amine salt solution.

The scrubbing operation may be effected in any suitable apparatus for contacting gases with liquids. Packed columns, bubble cap columns, and other known apparatus for this purpose may satisfactorily be employed. The scrubbing may be carried out semi-continuously by utilizing duplicate apparatus which may be employed alternately, but continuous operation may more readily be secured by passing the gases countercurrent to the scrubbing liquid, which later is passed continuously through the apparatus.

The pressure to be employed in the scrubbing operation is not critical, and may vary over a wide range. However, super-atmospheric pressure is desirable from the standpoint of reducing the partial pressure of the aldehydes and ketones, and thus lessening the danger of these materials leaving the scrubbing apparatus with the scrubbed gases. The temperature to be employed is likewise not critical, and may vary over a considerable range, depending upon the pressure utilized. Increased temperatures in general tend to favor more efficient scrubbing, and at super-atmospheric pressures the temperature may be increased substantially above atmospheric temperatures without danger of aldehydes and ketones being present in the exit gases. However, I have found that very satisfactory operation may be secured at atmospheric temperatures, e. g. 10—30° C.

I prefer to employ the salts of the cheap mineral acids, such as surfuric acid or hydrochloric acid. The concentration of the salt solution does not materially affect the efficiency of scrubbing, within relatively wide limits. Thus, I have found that complete removal of aldehydes and ketones can be secured when using solutions of hydroxylamine hydrochloride, ranging in concentration from one normal to saturated solutions at atmospheric temperatures. However, the total amount of the hydroxylamine salt present will determine the life of the scrubbing liquid before regeneration is necessary, and from this standpoint it is desirable to use concentrated solutions, e. g., approximately saturated, for batch or semi-continuous operation.

It will be apparent to one skilled in the art that the solvent for the hydroxylamine salt employed in my process serves merely in a physical capacity to insure satisfactory contact between the gases and the hydroxylamine salt, and is therefore not at all critical in its nature or constitution. Any solvents commonly known in the art to be capable of dissolving hydroxylamine salts will obviously serve this purpose. For reasons previously stated, I prefer to employ the hydroxylamine salts of the common mineral acids, for which water and other suitable solvents are specified at page 367 of the 20th edition of the "Handbook of Chemistry and Physics" (Chemical Rubber Publishing Co., Cleveland, 1935).

The amount of scrubbing liquid required per unit volume of gas will of course depend upon the initial concentration of aldehydes and ketones in the gases, and upon the efficiency of contact between the gases and liquid secured in the apparatus. The amount of scrubbing liquid, per volume of gas, will also depend to some extent upon the solubility of the aldehydes and ketones being scrubbed out. Thus in the nitration of the higher paraffin hydrocarbons, the higher aldehydes and ketones produced are less water soluble than the lower molecular weight aldehydes and ketones produced in the nitration of the lower hydrocarbons. However, it will be found that this factor is largely offset by the more efficient removal of the higher molecular weight compounds by condensation, simultaneously with the removal of the nitroparaffins, prior to the scrubbing treatment. In any event, the rate of flow of the gases through the scrubbing liquid in batch or semi-continuous operation, or the relative rates of flow of gases and scrubbing liquid in continuous operation, may be regulated by determining the amounts of aldehydes and ketones in the exit gases. The minimum ratio of scrubbing liquid to gas volume may also be determined by following the yields and conversions obtained with the recycled gases, since these will decrease if aldehydes and ketones are recycled with the hydrocarbons.

The aldehydes and ketones absorbed in the hydroxylamine salt solution may readily be recovered simply by distillation from such solutions. Approximately theoretical recovery of the absorbed materials may be secured in this manner, and the residual hydroxylamine solutions are fully regenerated for further use in absorption. In the case of batch or semi-continuous operation, the regeneration may be effected by batch distillation, and in the case of continuous scrubbing the regeneration may be obtained by passing the scrubbing liquid through a continuous still or evaporator, prior to recycling to the scrubbing apparatus.

My invention may be illustrated by the following specific examples:

Example I

The reaction products from the nitration of propane with nitric acid were passed through a condenser maintained at approximately 15° C. to remove the nitroparaffins, and the bulk of the water vapor. The resulting gases were then passed through a packed column, containing a solution of hydroxylamine hydrochloride of approximately 45% concentration by weight, at a rate of approximately 20 cu. ft. of gas per gallon of scrubbing liquid per hour. The gases entering the scrubber contained approximately 3 g. moles of aldehydes and ketones per 100 cu. ft., and the exit gases were found to be free from these substances. On distillation of the scrubbing liquid, substantially complete recovery of the absorbed aldehydes and ketones was secured.

Example II

The reaction products from the nitration of propane with nitric acid were passed through a condenser maintained at approximately 15° C. to remove the nitroparaffins and the bulk of the water vapor. The resulting gases were then passed through a packed column, containing a solution of hydroxylamine sulfate of approximately 30% concentration by weight, at a rate of approximately 20 cu. ft. of gas per gallon of scrubbing liquid per hour. The gases entering the scrubber contained approximately 3 g. moles of aldehydes and ketones per 100 cu. ft., and the exit gases were found to be free from these substances. On distillation of the scrubbing liquid, substantially complete recovery of the absorbed aldehydes and ketones was secured.

It is to be understood, of course, that the above example is illustrative only and does not limit the scope of my invention. Although my invention is especially adapted to the removal of aldehydes and ketones from the reaction products of the nitration of the lower paraffin hydrocarbons such as ethane, propane, and butane, my process is also applicable to vapor phase cyclic processes for the nitration of any of the other paraffin hydrocarbons. Similarly, my process may be effected by the use of any of the hydroxylamine salts of the type herein specified as well as those specified in the examples. Also, my scrubbing procedure may be combined with other steps for the purification of the gases for recycling in nitration reactions, and may even be used in conjunction with other procedures for removing aldehydes and ketones from such gases. Various other modifications of procedure will of course be apparent to those skilled in the art, and it is to be understood that such modifications, and the use of any equivalents for the materials or apparatus specified herein, are included within the scope of my invention.

My invention now having been described, what I claim is:

1. In a cyclic process for the nitration of lower alkanes in which the nitrating agent is chosen from the class consisting of nitric acid vapor and nitrogen dioxide, and in which unreacted lower alkane in the gaseous reaction products is recovered and recycled, the steps which comprise removing lower nitroalkanes from the gaseous mixture comprising lower nitroalkanes, aldehydes, and ketones resulting from the action of said nitrating agents on lower alkanes, and subjecting the remaining gases to contact with a mineral acid salt of hydroxylamine which is capable of absorbing aldehydes and ketones.

2. In a cyclic process for the nitration of lower alkanes in which the nitrating agent is chosen from the class consisting of nitric acid vapor and nitrogen dioxide, and in which unreacted lower alkane in the gaseous reaction products is recovered and recycled, the steps which comprise removing lower nitroalkanes from the gaseous mixture comprising lower nitroalkanes, aldehydes, and ketones resulting from the action of said nitrating agents on lower alkanes, and subjecting the remaining gases to scrubbing with a solution of a mineral acid salt of hydroxylamine which is capable of absorbing aldehydes and ketones at temperatures of 10–30° C.

3. A cyclic process for the nitration of ethane in which the nitrating agent is chosen from the class consisting of nitric acid vapor and nitrogen dioxide, and in which unreacted ethane in the gaseous reaction products is recovered and recycled in the process, the steps which comprise removing lower nitroalkanes from the gaseous mixture comprising lower nitroalkanes, aldehydes and ketones resulting from the action of said nitrating agents on ethane, and subjecting the remaining gases to scrubbing with a solution of a mineral acid salt of hydroxylamine which is capable of absorbing aldehydes and ketones.

4. A cyclic process for the nitration of propane in which the nitrating agent is chosen from the class consisting of nitric acid vapor and nitrogen dioxide, and in which unreacted propane in the gaseous reaction products is recovered and recycled in the process, the steps which comprises removing lower nitroalkanes from the gaseous mixture comprising lower nitroalkanes, aldehydes and ketones resulting from the action of said nitrating agents on propane, and subjecting the remaining gases to scrubbing with a solution of a mineral acid salt of hydroxylamine which is capable of absorbing aldehydes and ketones.

5. A cyclic process for the nitration of butane in which the nitrating agent is chosen from the class consisting of nitric acid vapor and nitrogen dioxide, and in which unreacted butane in the gaseous reaction products is recovered and recycled in the process, the steps which comprise removing lower nitroalkanes from the gaseous mixture comprising lower nitroalkanes, aldehydes and ketones resulting from the action of said nitrating agents on butane, and subjecting the remaining gases to scrubbing with a solution of a mineral acid salt of hydroxylamine which is capable of absorbing aldehydes and ketones.

6. In a cyclic process for the nitration of lower alkanes in which the nitrating agent is chosen from the class consisting of nitric acid vapor and nitrogen dioxide, and in which unreacted lower alkane in the gaseous reaction products is recovered and recycled in the process, the steps which comprise removing lower nitroalkanes from the gaseous mixture comprising lower nitroalkanes, aldehydes, and ketones resulting from the action of said nitrating agents on lower alkanes, subjecting the remaining gases to scrubbing with a solution of an hydroxylamine salt of a mineral acid, to absorb aldehydes and ketones, and distilling the resulting scrubbing liquid to recover absorbed aldehydes and ketones.

7. In a cyclic process for the nitration of lower alkanes in which the nitrating agent is chosen from the class consisting of nitric acid vapor and nitrogen dioxide, and in which unreacted lower alkane in the gaseous reaction products is recovered and recycled in the process, the steps which comprise removing lower nitroalkanes from the gaseous mixture comprising lower nitroalkanes, aldehydes, and ketones resulting from the action of said nitrating agents on lower alkanes, subjecting the remaining gases to scrubbing with a solution of hydroxylamine hydrochloride of a concentration ranging from 1-normal to saturated, to absorb aldehydes and ketones, and distilling the resulting scrubbing liquid to recover absorbed aldehydes and ketones.

8. In a cyclic process for the nitration of propane in which the nitrating agent is chosen from the class consisting of nitric acid vapor and nitrogen dioxide, and in which unreacted propane in the gaseous reaction products is recovered and recycled in the process, the steps which comprises removing lower nitroalkanes from the gaseous mixture comprising lower nitroalkanes, aldehydes and ketones resulting from the action of said nitrating agents on propane, subjecting the remaining gases, at temperatures of 10–30°, to scrubbing with a solution of hydroxylamine hydrochloride of approximately 45% concentration by weight, to remove aldehydes and ketones, and distilling the resulting scrubbing liquid to recover absorbed aldehydes and ketones.

KENNETH JOHNSON.